United States Patent [19]

Suzuki et al.

[11] 4,092,512
[45] May 30, 1978

[54] TURNTABLE DRIVE MECHANISM IN ELECTRONIC OVEN

[75] Inventors: Ryuji Suzuki; Kimiaki Yamaguchi; Shunichi Nagamoto; Takashi Niwa, all of Nara; Haruo Matsushima, Yamatokoriyama, all of Japan

[73] Assignee: Matsushita Electric Industrial Co. Ltd., Kadoma, Japan

[21] Appl. No.: 715,644

[22] Filed: Aug. 18, 1976

[30] Foreign Application Priority Data

| Aug. 27, 1975 | Japan | 50-104376 |
| Sept. 2, 1975 | Japan | 50-106736 |
| Sept. 3, 1975 | Japan | 50-107197 |
| Sept. 9, 1975 | Japan | 50-109688 |
| Sept. 12, 1975 | Japan | 50-111436 |

[51] Int. Cl.² .................................... H05B 9/06
[52] U.S. Cl. .................... 219/10.55 F; 310/103; 219/10.55 E
[58] Field of Search ............... 219/10.55 D, 10.55 E, 219/10.55 F; 126/41 A, 44, 161, 150, 338, 211; 198/803; 312/135; 108/94, 99, 44.3 C, 44.3 R, 423, 20; 324/95, 128, 58.5; 310/103, 104, 105; 211/78, 77, 95

[56] References Cited

U.S. PATENT DOCUMENTS

| 846,948 | 3/1907 | Richter | 211/77 |
| 2,824,638 | 2/1958 | De Burgh | 310/103 |
| 2,890,088 | 6/1959 | Lepry et al. | 108/20 |
| 3,302,594 | 2/1967 | Barnett et al. | 211/78 |

*Primary Examiner*—J.V. Truhe
*Assistant Examiner*—Bernard Roskoski

[57] ABSTRACT

A turntable drive mechanism for a microwave oven having an oven-defining structure having a bottom wall and a hingedly supported door for selectively closing and opening an access opening leading into the interior of the oven-defining structure. The turntable drive mechanism has a turntable assembly removably positioned on the bottom wall for rotation about its own center through a plurality of rollers situated between the turntable assembly and the bottom wall, and a plurality of magnets. Cooperating with these magnets carried by the turntable assembly are magnets carried by a rotary carriage driven by a drive unit in one direction and situated below the bottom wall and externally of the oven-defining structure. Rotation of the turntable assembly is induced by rotation of the rotary carriage by the effect of magnetic forces of attraction developed through the bottom wall between the magnets on the turntable assembly and the magnets on the rotary carriage.

22 Claims, 6 Drawing Figures

TURNTABLE DRIVE MECHANISM IN ELECTRONIC OVEN

The present invention generally relates to a high frequency heating apparatus or a microwave oven and, more particularly, to a turntable drive mechanism for rotating within a heating chamber of the microwave oven a turntable for the support of a material to be heated.

A microwave oven is well known to those skilled in the art as generally comprising an oven-defining structure having a heating chamber therein and an access opening in communication with the heating chamber, a high frequency generator of the magnetron type for producing standing electromagnetic waves in the heating chamber and a hingedly supported door for selectively opening and closing the access opening. There are many commercially available types of microwave ovens, including the type wherein a turntable is employed for the support of a material to be heated within the heating chamber of the oven-defining structure so that the material to be heated can be rotated together with the turntable while receiving standing electromagnetic waves for the purpose of uniform heating of the material.

In the conventional microwave oven of the type having the turntable as described above, the turntable is operatively coupled to a drive mechanism, such as an electrically operated motor, by means of a shaft extending between the turntable and the motor through a bottom wall portion of the oven-defining structure which, together with ceiling and side wall portions, defines the heating chamber.

Because of the shaft rotatably extending through the bottom wall portion of the oven-defining structure, some disadvantages and inconveniences have been found. For example, an expensive and complicated bearing mechanism and parts associated therewith are necessary to substantially avoid the possibility of leakage of microwaves from the heating chamber through a clearance present between the shaft and a bearing hole in the bottom wall portion of the oven-defining structure and also to minimize the possibility of heating the shaft. In addition, even if the arrangement is such that the turntable is removably mounted on a portion of the shaft projecting into the heating chamber, complete and easy cleaning of the heating chamber tends to be hampered because of the presence of that portion of the shaft within the heating chamber.

Moreover, whatever type of bearing mechanism is employed for the support of the shaft at the position where it rotatably extends through the bottom wall portion of the oven-defining structure, fluid medium, for example, a mixture of water, which is condensed within the heating chamber and/or which has overflowed from a container in which the material to be heated is accommodated, and oil running from the material being heated, or one or the other of the water and oil, tends to penetrate past the shaft into a motor space underneath the bottom wall portion of the oven-defining structure.

Accordingly, the present invention is intended to provide an improved version of the turntable drive mechanism in the microwave heating apparatus, which substantially eliminates the disadvantages and inconvenience inherent in the conventional microwave heating apparatus of the type having the turntable.

This object can be accomplished by the utilization of a magnetic coupling between the turntable and an electric motor with no drive shaft extending through the bottom wall portion of the oven-defining structure.

The idea of transmitting a rotational force by means of a magnetic coupling to an element to be rotated is not new and U.S. Pat. No. 2,520,602, patented on Aug. 29, 1950, discloses a cavity resonator having a microwave mode changer which comprises a rotary device, composed of a plurality of vanes or propeller blades and rotatably supported on a center bearing within a microwave enclosure forming the cavity resonator, which rotary device is shown to carry a pair of spaced magnetic iron pole pieces cooperating with permanent magnets which are carried by a motor shaft and spaced from each other a distance corresponding to the spacing between the magnetic iron pole pieces. The cavity resonator of the above numbered U.S. patent is designed such that the microwave modes can be varied by the rotation of the propellor blades. Specifically, as the motor shaft is rotated, the permanent magnets are also rotated about the motor shaft while they concurrently act to magnetically attract the respective iron pole pieces, with the propellor blades being consequently rotated about the center bearing by the angular movement of the magnetic iron pole pieces following the permanent magnets being rotated.

However, the purpose for which the magnetic coupling is employed in the above numbered U.S. patent is quite different from that of the present invention. Moreover, it is believed that introduction of the idea of a magnetic coupling such as disclosed in the above numbered U.S. patent into the conventional microwave oven of the type having the turntable arrangement does not make the present invention obvious for the reasons which will become clear from the detailed description of the present invention, and particularly by the reason of the presence of the following problems to be solved. Firstly, since the turntable used in the microwave oven according to the present invention is adapted to support a substantial weight thereon while it rotates about the center of rotation thereof, means for supporting the turntable above the bottom wall portion of the oven-defining structure, which neither makes use of nor is composed of a shaft member and a bearing mechanism, is necessary. Moreover, this turntable supporting means must be designed such as to allow the turntable to rotate about its own center of rotation without substantially involving any possible friction which may otherwise hamper a smooth rotation of the turntable.

Secondly, since the turntable according to the present invention is provided with magnets, protective measures are necessary to prevent the magnets from being adversely affected and/or deteriorated by the exposure to the standing electromagnetic waves within the heating chamber and also to prevent the magnets from unnecessarily stirring the standing electromagnetic waves within the same heating chamber.

Finally, the employment of the center bearing, as taught by the above numbered U.S. patent, for the support of the turntable above the bottom wall portion of the oven-defining structure tends to provide an obstruction to uniform distribution of electromagnetic waves within the heating chamber and also to the complete and easy cleaning of the heating chamber, so that it must be eliminated.

Another important object of the present invention is, therefore, to provide an improved turntable drive mechanism in the microwave oven which solves the foregoing problems without reducing the heating performance of the microwave oven.

These and other objects and features of the present invention can readily be understood from the following description of the present invention taken in conjunction with preferred embodiments thereof with reference to the accompanying drawings, in which.

Before the description of the present invention proceeds, it is to be noted that like parts are designated by like reference numerals throughout the accompanying drawings.

Figure 1:
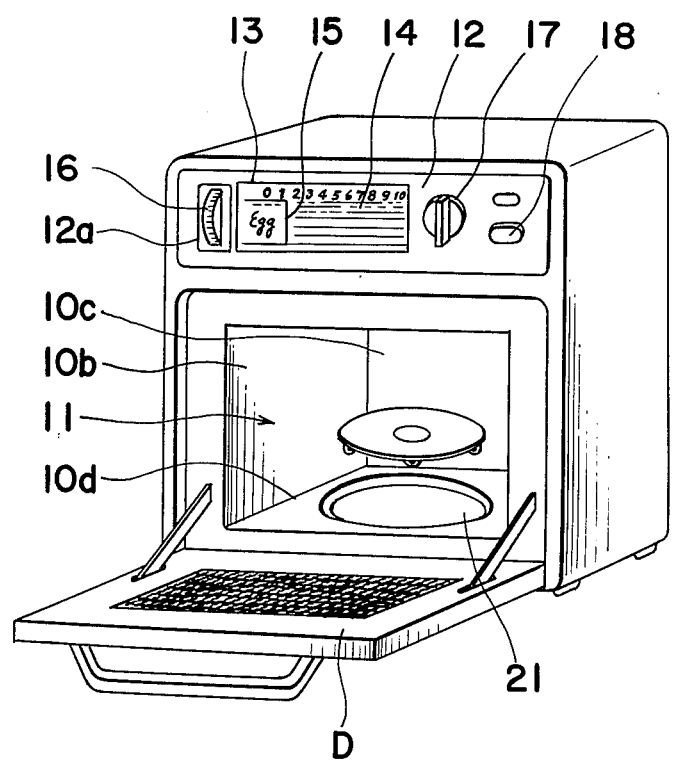
FIG. 1 is a perspective view of a microwave oven with a turntable shown separated from a turntable seating recess in a bottom wall of an oven-defining structure.
Figure 2:
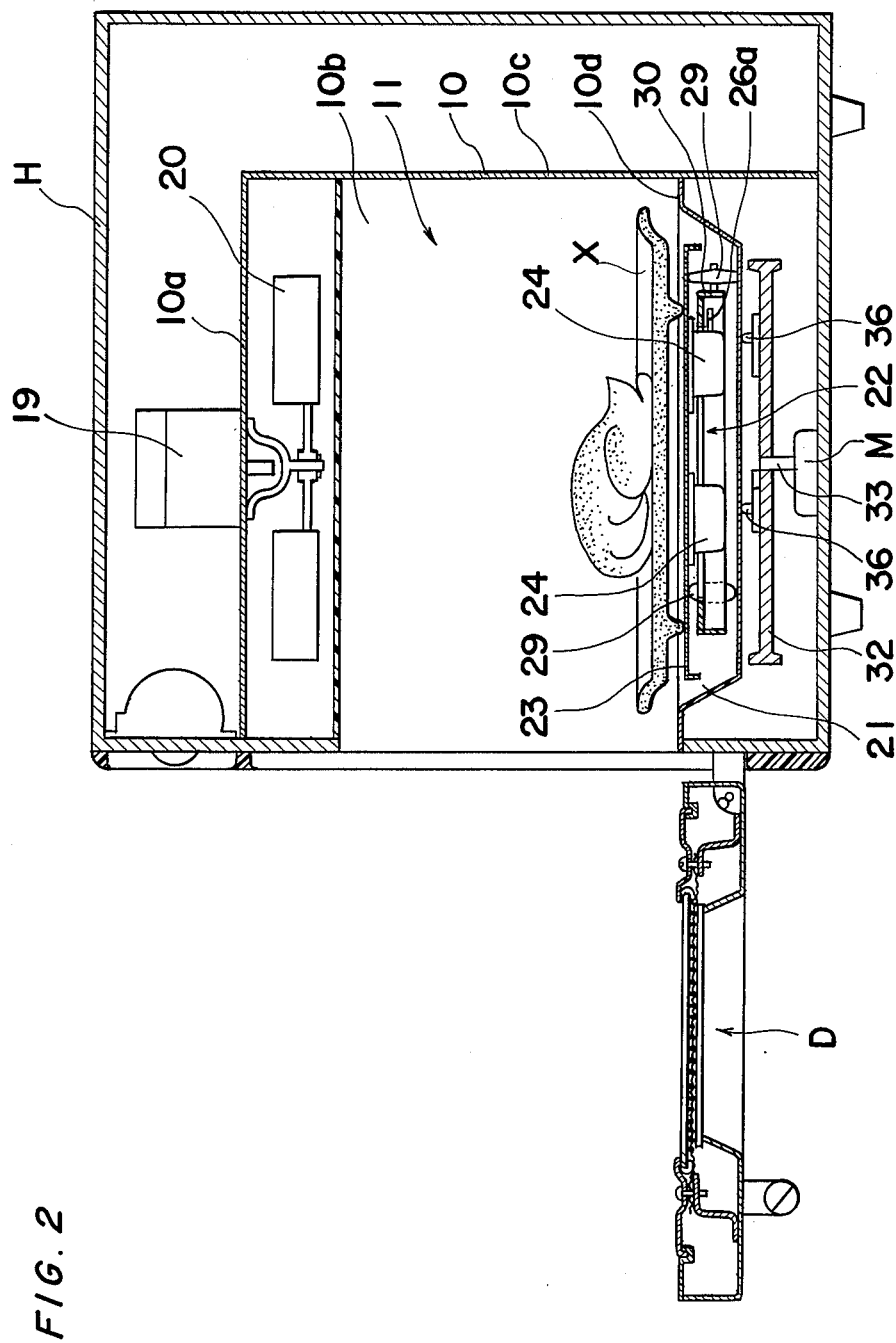
FIG. 2 is a side sectional view, on an enlarged scale, of the microwave oven shown in FIG. 1, with the turntable shown as carrying a material to be heated thereon in a ceramic dish.

Referring first to FIGS. 1 and 2, there is shown a microwave heating apparatus which comprises an oven-defining structure of substantially cubic shape made of metallic material, preferably 18Cr–8Ni stainless steel and having a hingedly supported door D adapted to selectively close and open an access opening through which a material, for example, a food item, to be heated is inserted into and removed from a heating chamber 11 defined in the oven-defining structure 10. An instrument panel 12 is provided above the access opening and is suitably supported in position by a framework, for example, a housing structure H for confining the oven-defining structure therein. This instrument panel 12 has a display window 13 through which a portion of a rotatable drum 14 having a plurality of menus imprinted on the outer peripheral surface thereof and a pointer needle 15 are exposed to the sight of the user of the microwave oven and also has a substantially vertically extending slot 12a through which a portion of a drum rotating ring 16 for rotating the drum 14 to register one particular menu on the outer peripheral surface of the drum 14 with the pointer needle 15.

Provided to the right of the display window 13 as viewed in FIG. 1 is a timer operating knob 17 mounted on a timer operating shaft (not shown) loosely extending through the instrument panel and a push-button type switch 18 operable so as to, upon closure thereof, initiate radiation of high frequency energy at the material to be heated within the heating chamber 11, it being understood that a timer (not shown) having the above described timer operating shaft is constructed so as to be driven in synchronism with the radiation of high frequency energy, that is, closure of the push-button type switch 18, and to interrupt an electric power supply to a high frequency generator 19 of the magnetron type best shown in FIG. 2 after a predetermined period of time set on the timer by manipulating the timer knob 17 has elapsed.

The high frequency generator 19 positioned within a space defined between the housing structure H and the oven-defining structure 10 and held in position above a top wall 10a, which forms the oven-defining structure 10 together with a pair of opposed side walls 10b (only one of which is shown), a rear wall 10c opposed to the access opening and a bottom wall 10d, is to be understood as operatively coupled to the heating chamber 11, the microwaves so introduced into the heating chamber 11 through the wave guide being stirred by a stirrer 20 which is rotated by a forced draft of cooling air used to cool the high frequency generator 19.

In any event, the microwave oven so far described and its operation are well known to those skilled in the art and, therefore, the details thereof are herein omitted for the sake of brevity.

In accordance with the teachings of the present invention, the bottom wall 10d is downwardly recessed at a central portion thereof to provide a turntable seating recess 21 for accommodating therein a turntable 22 of a construction which will now be described with particular reference to FIGS. 3 and 4.

Figure 3:
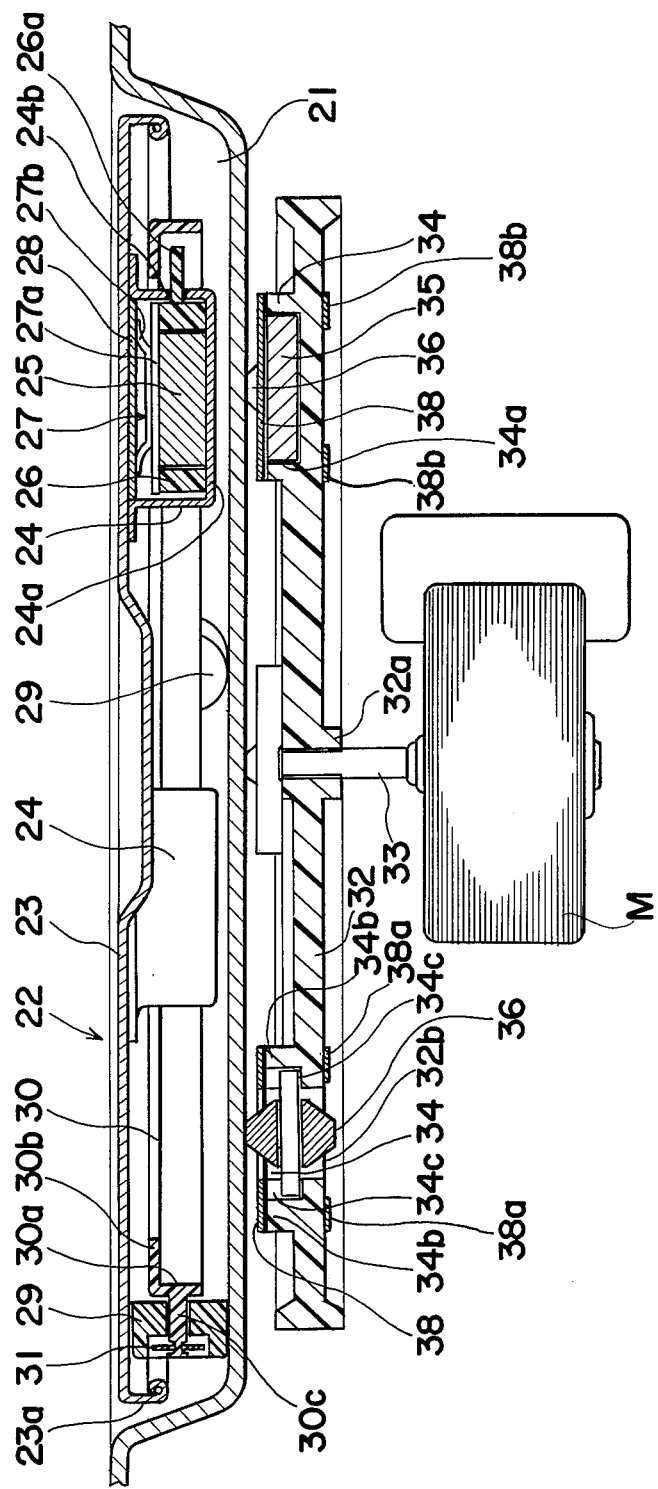
FIG. 3 illustrates the details, in sectional representation, of a turntable drive mechanism embodying the present invention, it being understood that the turntable and the rotary carrier disc, both employed in the microwave oven of FIG. 1, are respectively shown in cross section taken along the lines X—X and Y—Y in FIGS. 4 and 5.
Figure 4:
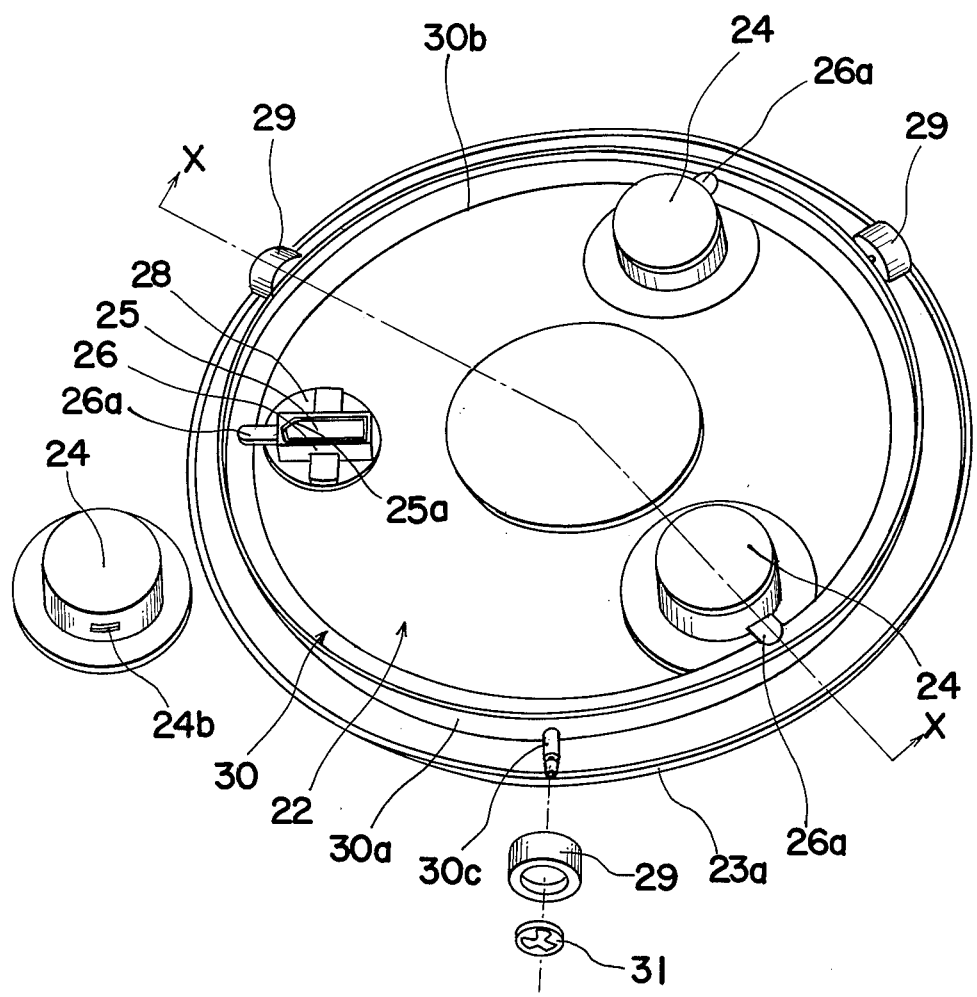
FIG. 4 is a partially exploded view of the turntable, which turntable is shown as turned upside down for the purpose of illustrating the details of the undersurface of the turntable.

Referring now to FIGS. 3 and 4, the turntable 22 accommodated within the recess 21 for rotation about its own center of rotation comprises a disc table 23 having a thickness of about 0.8 mm. and made of metallic material, preferably, 18Cr—8Ni stainless steel. The table 23 has a peripheral flange 23a protruding towards the bottom of the recess 21 and in a direction perpendicular to the plane of the table 23 and is inwardly curled as best shown in FIG. 3. This table 23 carries a plurality of cylindrical enclosures 24 secured, such as by means of welding, to the undersurface of the table 23 in equally spaced relation with respect to each other and also with respect to the center of the disc-shaped table 23. In the embodiment shown, the cylindrical enclosures are, however, three in number. Preferably, each of these cylindrical enclosures 24 is prepared by the use of any known drawing or hobbing technique from a metallic sheet, for example, a sheet of 18Cr—8Ni stainless steel, of 0.4 mm. in thickness.

Within a space or magnet chamber defined by each of the enclosures 24 in cooperation with the undersurface of the table 23, a permanent magnet 25 having a substantially rectangular cubic body, which is prepared from a ferritic anisotropic magnet containing strontium, is steadily housed in a manner as will subsequently be described. However, it is to be noted that the permanent magnet 25 for each enclosures 24 may be dimensioned 12 mm. in width, 40 mm. in length and 8 mm. in thickness and has the direction of magnetism conforming to the direction of thickness of the magnet. In other words, the opposite poles, i.e. the N and S poles, of magnetism are respectively located at the surfaces of the magnet 25 which are opposed to each other in the direction of the thickness thereof.

Each of the magnets 25 is held within the corresponding enclosure 24 with one of the opposed polarized surfaces, for example, the S-pole surface, in contact with an end plate 24 of the corresponding enclosure 24 while being retained by a corresponding magnet holding fixture 26 which is laterally non-movably accommodated within the corresponding enclosure 24 and which has a substantially rectangular opening extending completely through the thickness of said fixture 26 and accommodating the magnet 25 therein. The fixture 26 for each magnet 25 may have a thickness substantially equal to or slightly smaller than the thickness of the magnet 25 and is made of synthetic resin, preferably polypropylene, having a relatively high resistance to an elevated temperature.

As best shown in FIG. 3, for avoiding any possible movement of the magnet 25 in a direction perpendicular to the undersurface of the table 23, a resilient depresser 27 made of stainless steel and having a presser plate 27a and a pair of spring arms 27b is utilized and accommodated in position within a portion of the magnet chamber above the magnet 25 in such a manner that the presser plate 27a resiliently biases the magnet 25 with free ends of the respective arms 27b held in contact with the undersurface of the table 23 through a magnetic shielding disc 28 of metallic material, preferably 18Cr stainless steel or electroplated iron plate.

The fixture 26 for each magnet 25 has a tongue 26a integral therewith and extending therefrom in a radially outward direction of the table 23 towards the outside of the corresponding enclosure 24 through a slit 24b defined in a cylindrical wall of the enclosure 24, the function of which tongue 26a will become apparent from the subsequent description.

Mounting of the magnets 25 within the respective enclosures 24 through the associated fixtures 26 is preferably such that the lengthwise direction thereof extends in alignment with the radial direction of the table 23.

The table 23 carrying the magnets 25 in the manner as hereinbefore fully described is rotatably mounted on the bottom wall within the recess 21 of the oven-defining structure 10 on a plurality of rollers, for example, three rollers 29, made of synthetic resin, preferably polytetrafluoroethylene reinforced with glass fiber, which rollers 29 are rotatably carried by a carrier ring 30 in the following manner.

The carrier ring 30 is made of synthetic resin, preferably polysulfone or glass fiber reinforced polypropylene, and is constituted by a cylindrical wall 30a and a radially inwardly protruding annular flange 30b, said cylindrical wall 30a having an outer diameter smaller than the diameter of the table 23 and said annular flange 30b having a central opening of a diameter greater than twice the maximum distance between the center of the table 23 and the position of the slit 24b on the cylindrical wall of any one of the enclosures 24. The cylindrical wall 30a of the carrier ring 30 has a plurality of shafts 30c integral with said cylindrical wall 30a and radially outwardly extending therefrom in circumferentially equally spaced relation to each other and terminating below and inside the periphery of the table 23, the number of the shafts 30c being equal to the number of the rollers 29 employed.

The rollers 29 are rotatably mounted on the respective shafts 30c extending therethrough and in turn mounted with respective circlips 31 which are made of synthetic resin, preferably polypropylene, and which prevent any possible separation of the rollers 29 from the associated shafts 30c. The rollers 29 are of the same construction and design and may have an outer diameter of 20 mm. and a width of 10 mm. and are so supported in position that one complete revolution of any one of the rollers 29 while the latter rotates about about the longitudinal axis of the corresponding shaft 30c results in one or more complete rotations of the table 23 about the center thereof.

The carrier ring 30 of the above described construction is so elastically deformable that, merely by twisting it in any conventional manner, it can be mounted on and removed from the turntable assembly 22 constituted by the table 23 and the enclosures 24 having the magnets 25 therein. It is to be noted that, since the tongues 26a integral with the respective fixtures 26 within the corresponding enclosures 24 are so sized as to terminate at a position spaced from the center of the table 23 a distance greater than the radius of the central opening in the annular flange 30b of the carrier ring 30 and smaller than the inner radius of the cylindrical wall 30a of the same carrier ring 30, the carrier ring 30 can be retained in position by the tongues 26a with the annular flange 30b loosely situated between the undersurface of the table 23 and the tongues 26a as best shown in FIG. 3 when the carrier ring 30 is mounted on the turntable assembly 22. Therefore, it is clear that, when the turntable assembly 22 mounted on the bottom wall of the oven-defining structure within the recess 21 through the rollers 29 carried by the carrier ring 30 is to be removed from the recess 21, the carrier ring 30 carrying the rollers 29 can also be removed therefrom together with the turntable assembly 22 because of the annular flange 30b loosely situated between the tongues 26a and the undersurface of the table 23.

It is to be noted that each of the enclosures 24 is so sized as to provide a spacing of about 2 mm. between the bottom wall of the oven-defining structure 10 within the recess 21 and the end plate 24a of the corresponding enclosure 24 when the turntable assembly 22 is mounted on said bottom wall of the oven-defining structure 10 through the rollers 29 in the manner as hereinbefore described. Alternatively, the spacing of about 2 mm. between the bottom wall of the oven-defining structure 10 and the end plate 24a can be achieved by suitably selecting the diameter of each of the rollers 29 and/or the position of any one of the shafts 30c integral with the cylindrical wall 30a of the carrier ring 30.

Figure 5:
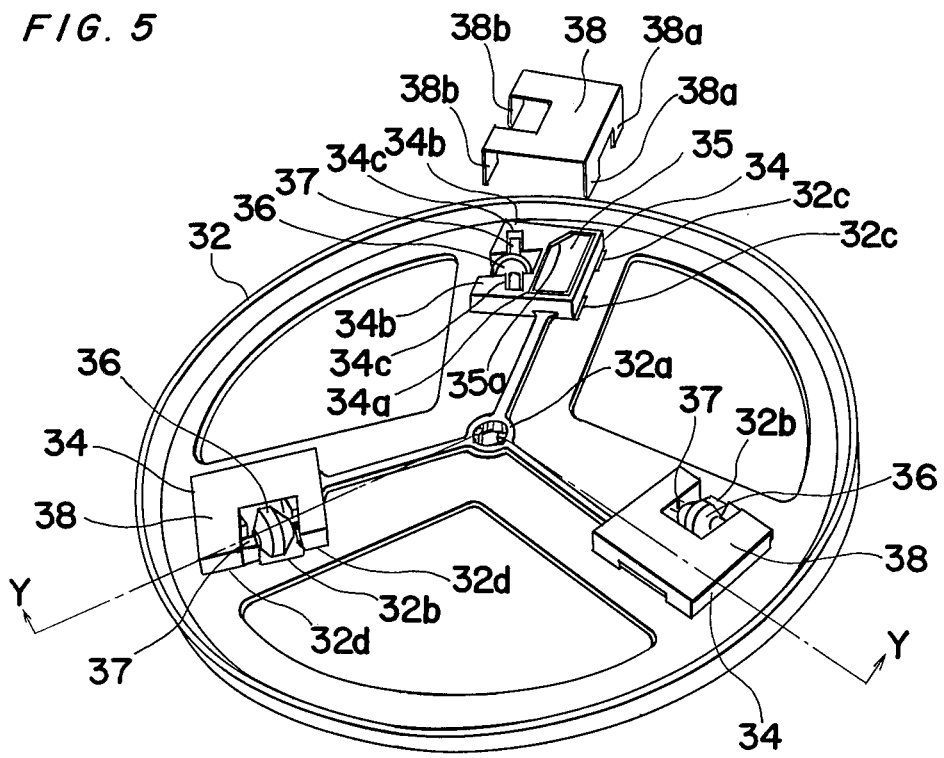
FIG. 5 is a perspective view of the rotary carrier disc.

Referring now to FIGS. 2, 3 and 5, a guide wheel 32 is mounted on a drive shaft 33, coupled to an electrical motor M, for rotation together with the drive shaft 33 and is situated below the bottom wall of the oven-defining structure 10 and above the bottom wall of the housing structure or cabinet H with its center substantially aligned with the center of the bottom wall within the turntable seating recess 21. The drive shaft 33 may be a part of the motor M if the latter is of a type having a reduction gear mechanism, that is, of a type generally referred to as a 'geared motor", or otherwise it is to be understood as operatively coupled to the motor M through any suitable reduction gear. Furthermore, operative connection between the shaft 33 and the motor M may be made by way of an endless belt transmission system or any other suitable transmission. In any event, it is to be understood that the drive shaft 33 preferably rotates about ten rotations per minute.

The guide wheel 32 is made of synthetic resin, preferably polyacetal resin, and has a hub 32a formed at the center of said guide wheel 32, which hub 32a has a key-grooved or splined bearing hole through which the guide wheel 32 is mounted on the drive shaft 33 having a free end portion key-grooved or splined in complementary relation to the key-grooves or splines in the bearing hole in the hub 32a. The guide wheel 32 also has a plurality of magnet holders 34 equal in number to the number of the permanent magnets 25 carried by the turntable 23, which magnet holders 34 are integrally formed with, or otherwise rigidly mounted on, the guide wheel so as to face the bottom wall of the oven-defining structure 10 in equally spaced relation with respect to each other and also with respect to the hub 32a.

As best shown in FIGS. 3 and 5, three permanent magnets 35 of the same material, dimensions and magnetic characteristics as those of the magnets 25 carried by the table 23 are respectively fitted into and, therefore, accommodated within the associated magnet holders 34 in such a manner that one of the opposed polarized surfaces of any of the magnets 35, which is opposite in polarity to the polarized surface of any one of the magnets 25 held in contact with the end plate 24a of the associated enclosure 24, that is, the N-pole surface of each of the magnets 35, faces the bottom wall of the oven-defining structure 10. These permanent magnets 35 are also arranged within the associated magnet holders 34 with the lengthwise direction thereof extending in alignment with the radial direction of the guide wheel 32 in a similar manner as with the permanent magnets 25. Furthermore, each of the magnets 35 is spaced from the center of rotation of the guide wheel 32 a distance substantially equal to the distance between the center of the turntable assembly 22 and the positions of the permanent magnets 25 so that each of the permanent magnets 35 carried by the guide wheel 32 forms a pair with one of the magnets 25 carried by the table 23, a magnetic force of attraction being induced between the permanent magnets 25 and 35 of each pair through the bottom wall of the oven-defining structure.

While the holders 34 have their respective recesses formed therein at 34a, into which recesses 34a the associated permanent magnets 35 are fitted in the manner as hereinbefore described, a pair of spaced bearing arms 34b are also formed on each of the magnet holders 34. These bearing arms 34b of each pair are integral with the associated holder 34 and also with the guide wheel 32 and substantially extend laterally of the radial direction of the guide wheel 32. These bearing arms 34b of each pair have at 34c respective bearing recesses which are aligned with each other and also with the radial direction of the guide wheel 32.

A spacer roller 36 having a shaft member 37 on which it is rotatably mounted is accommodated within the space defined between the space bearing arms 34b of each pair, with opposed end portions of said shaft member 37 loosely engaged in the bearing recesses 34c in the bearing arms 34b of each pair. In the instance as shown, since the outer diameter of the spacer roller 36 is greater than the maximum thickness of the guide wheel 32, that is, the thickness of the guide wheel 32 at each magnet holder 34, the guide wheel 32 has an opening for each roller 36, formed at 32b as best shown in FIG. 3, for accommodating the associated roller 36 in cooperation with the space between the bearing arms 34b. The spacer rollers 36 are made of synthetic material, preferably polyacetal resin, while the shaft members 37 for the support of the respective spacer rollers 36 are made of metallic material, preferably stainless steel.

It is to be noted that, when the spacer rollers 36 are so mounted on the guide wheel 32 in the manner as described above, the shaft members 37 are aligned in the radial direction of the guide wheel 32 and spaced 120° from each other in the circumferential direction of the wheel 32.

Top openings of the recesses 34a and bearing recesses 34c are closed by respective cover plates 38 each being of a substantially U-shaped configuration as best shown in FIG. 5 and made of 18Cr—8Ni stainless steel. Each of these cover plates 38 is shown to have two pairs of bent over end members 38a and 38b which, while the intermediate area of the cover plate 38 overlays the magnet 35 and the pair of arms 34b, extend through respective pairs of slits 32c and 32d defined in the guide wheel 32, and are in turn bent in the opposite directions with respect to each other against the undersurface of the guide wheel. These cover plates 38 may not always be necessary if the permanent magnets 35 are bonded within the associated recesses 34a of the holders 34 and the spacer rollers 36 are supported in the manner as shown or are rotatably mounted on respective shaft members which extend through respective pairs of arms 34b, and may, therefore, be omitted.

It is to be noted that each of the spacer rollers 36 is preferably so designed and so supported as to provide a spacing of about 1 mm. between the top surface of the associated cover plate 38 and the undersurface of the bottom wall of the oven-defining structure 10. If the diameter of each of the rollers 36 and/or the position of each of the shaft members 37 for the support of the respective rollers 36 are fixed, this spacing of about 1 mm. can alternatively achieved by suitably positioning the guide wheel 32 relative to the bottom wall of the oven-defining structure 10. It is also to be noted that, where the guide wheel 32 has sufficient rigidity such that it will not deform with respect to the plane of rotation thereof during the life time of the microwave oven embodying the present invention, the spacer rollers 36 and their associated parts may not be always necessary.

Figure 6:
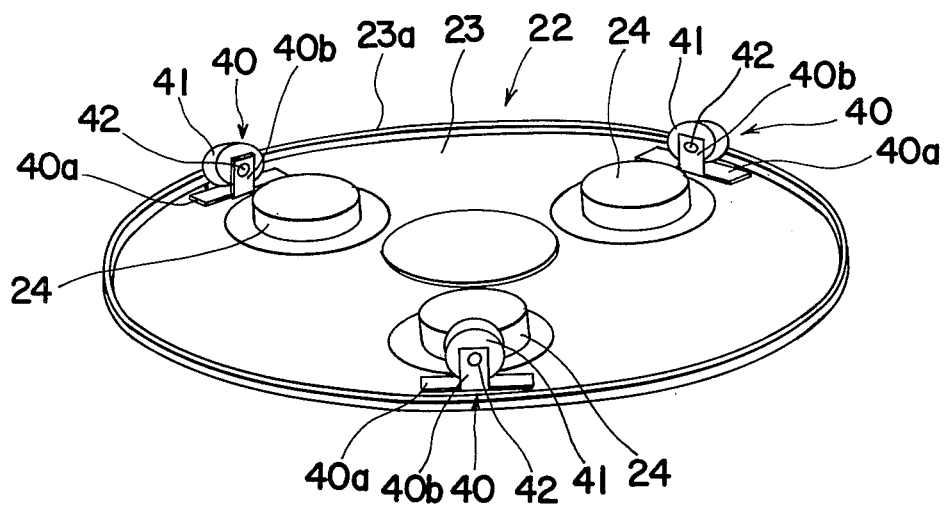
FIG. 6 is a view similar to FIG. 4, showing a modified turntable.

The turntable assembly best shown in FIGS. 2 to 4 may be modified such as shown in FIG. 6. In describing the modification of the turntable assembly shown in FIG. 6, it is to be noted that like parts shown in FIGS. 2 to 4 and in FIG. 6 are designated by like reference numerals for a better understanding of the modification of FIG. 6.

In the turntable assembly 22 shown in FIG. 6, instead of the employment of the carrier ring 30 having the rollers 29 shown in FIGS. 2 to 4, a plurality of wheel assemblies, for example, three wheel assemblies as generally designated by 40, are employed. The employment of the wheel assemblies 40 precludes the provision of the tongues 26a and the slits 24b from the fixtures 26 and the enclosures 24, respectively, since no carrier ring such as shown by 30 in FIGS. 2 to 4 is employed at all in FIG. 6.

Each of the wheel assemblies 40 shown in FIG. 6 comprises a rectangular base 40a having an substantially intermediate portion with a pair of spaced arms 40b having their ends integral with the opposed side edges of the base 40a. A roller 41, made of synthetic resin, preferably polytetrafluoroethylene reinforced with glass fiber, is rotatably supported by the arms 40b of each base 40a through a shaft member 42 having both ends journalled in the respective arms 40b with the roller 41 mounted thereon between said arms 40b.

These wheel assemblies 40, each having the construction as hereinbefore described, are connected to the table 23 with their respective bases 40a secured to the undersurface of the table 23.

The turntable drive mechanism according to the present invention operates in the following manner.

When the motor M is energized, the guide wheel 32 is rotated about the drive shaft 33 at a speed of, for example, 10 rpm. Upon and during rotation of the guide wheel 32, the permanent magnets 35 carried thereby revolve around the drive shaft 33 causing a corresponding revolution of the permanent magnets 25 carried by the table 23. This is possible because individual magnetic forces of attraction are respectively developed between the permanent magnets 35 and the permanent magnets 25 so that the permanent magnets 25 being revolved as the guide wheel 32 rotates pull the permanent magnets 25 in the same direction as the direction of revolution of the permanent magnet 35 with consequent rotation of the turntable 23 about its own center which is then aligned with the longitudinal axis of the drive shaft 33. The magnetic forces of attraction developed between the permanent magnets 25 and 35 of the three pairs of magnets not only serve to transmit the rotational force of the guide wheel 32 to the turntable assembly 23 in the manner as hereinbefore described, but also serve to maintain an exact alignment of the center of the turntable 23 with the longitudinal axis of the drive shaft 33 about which the guide wheel 32 rotates.

During the rotation of the turntable 23 in the manner as hereinbefore described, the rollers 29 or 41 revolve while rotating about the respective shaft members 30c or 42. However, while the rollers 41 rotate only in contact with the bottom wall of the oven-defining structure 10 within the turntable seating recess 21 when the turntable assembly 22 is constructed as shown in FIG. 6, the rollers 29 in the embodiment of FIGS. 2 to 4 rotate in contact with the bottom wall of the oven-defining structure 10 within the recess 21 and also with the undersurface of the table 23.

Particularly where the turntable assembly 22 is constructed as shown in FIGS. 2 to 4, the carrier ring 30 also rotates about its own center during revolution of the rollers 29 while the latter rotate about the respective shaft members 30c. Therefore, it is clear that, as compared with the turntable assembly having the construction shown in FIG. 6, the turntable assembly 22 having the construction shown in FIGS. 2 to 4 is designed such that no substantial friction occurs during the rotation of the turntable 23 induced by the rotation of the guide wheel 32 by the effect of the magnetic forces of attraction between the magnets 25 and 35 of the three pairs.

A series of experiments conducted with a load of about 10 kg mounted on each of the turntable assembly of FIGS. 2 to 4 and the modified turntable assembly of FIG. 6 have shown that the amount of torque necessary to rotate the turntable assembly of FIGS. 2 to 4 is about half the amount of torque necessary to rotate the modified turntable assembly of FIG. 6.

Referring to FIG. 2, it will readily be seen that a material to be heated is mounted on the turntable assembly 22 within the heating chamber 11 in a ceramic dish X preferably made of borosilicate glass. Depending upon the type of the material to be heated, the ceramic dish X may not be used and the material to be heated may be directly mounted on the turntable assembly 22. In either case, it is clear that, since the turntable assembly 22 is rotated about its own center in the manner as hereinbefore fully described by the magnetic coupling between the permanent magnets 25 and 35 of the three pairs, the material to be heated can be uniformly heated. In addition, removal from turntable assembly 22 out of the heating chamber 11 does not leave any part of the turntable assembly 22 within the heating chamber 11 and above the bottom wall of the oven-defining structure 10 and, therefore, substantially complete cleaning of the heating chamber is facilitated.

Still referring to FIGS. 4 and 5, for facilitating mounting of the magnets 25 and 35 respectively on the turntable assembly 22 and the guide wheel 32 during the manufacture of the oven embodying the present invention, these magnets 25 and 35 are shaped to have respective cut-out portions 25a and 35a at the same position of the magnets. On the other hand, the fixtures 26 are correspondingly shaped to have respective openings with a cross section complementary in shape to the cross section of the magnets 25 having the cut-out portions 25a while the recesses 34a in the holders 34 are also correspondingly shaped to have a cross section complementary in shape to the cross section of the magnets 35 having the cut-out portions 35a. By so doing, it will be appreciated that, during assemblage of the turntable drive mechanism according to the present invention, the possibility can substantially be avoided of erroneous mounting of the magnets 25 and 35 respectively on the turntable assembly 22 and the guide wheel 32 in such a manner that the polarity at the surface of any of the magnets 25 or 35 facing any of the magnets 35 or 25 through the bottom wall of the oven-defining structure is not opposite to the polarity at the surface of any of the magnets 35 or 25 facing any of the magnets 25 or 35, respectively. It is to be noted that, without the cut-out portion being formed in each of the magnets 25 and 35, the same purpose can also be achieved by an alternative method, for example, by employing any suitable marking on at least one surface of each of the magnets to designate the polarity at such one surface of the magnet.

18Cr—8Ni stainless steel is known to be a non-magnetizable steel and, therefore, has been described as employed as a preferred material for the enclosures 24, the walls of the oven-defining structure 10 including the bottom wall 10d, and the cover plates 38, all of these elements 24, 10d and 38 being positioned between the permanent magnets 25 and 35 of the three pairs without the magnetic forces of attraction between these magnets 25 and 35 being disturbed thereby. However, it is to be noted that, instead of 18Cr—8Ni stainless steel, any other non-magnetizable metallic material, such as aluminum, may also be used as a material at least for these elements 24, 10 and 38.

In addition, the magnets 25 and 35 have been described as prepared from ferritic magnets. This is because a ferritic magnet is inexpensive and can hardly be demagnetized. However, a ferritic magnet is, on the other hand, known as a microwave absorbing element and, therefore, tends to become red-hot when exposed to the standing microwaves and may ultimately be destroyed. If the ferritic magnet is processed so as to have a relatively high specific resistance, heating of the ferritic magnet can be substantially avoided although it becomes expensive. Moreover, the ferritic magnet is so fragile that mechanical protection is required.

In the present invention, the inexpensive and fragile ferritic magnets can be employed since they are positioned below the turntable 23 and housed within the stainless steel enclosures 24 which shield such magnets 25 from the standing microwaves. This provides an additional advantage in that there is substantially no possibility of the electromagnetic field within the heating chamber 11 being disturbed.

Furthermore, the number of pairs of magnets 25 and 35 need not be always limited to three such as shown, but may be two or more for reasons which are well understood by those skilled in the art. If the turntable assembly is provided with a center bearing mounted on the bottom wall of the oven-defining structure 10 and about which it rotates, one pair of the magnets 25 and 35 may suffice, but this is not the subject of the present invention.

Although the present invention has been fully described by way of example, it is to be noted that various changes and modifications will be apparent to those skilled in the art. For example, the bottom wall 10d of the oven-defining structure 10 need not be always recessed at 21. Where the recess 21 is employed as shown for accommodating therein the turntable assembly, although the magnets 25 carried by the table 23 and the magnets 35 carried by the guide wheel 32 in the foregoing embodiment have been described as arranged such that the lower surface of each of the magnets 25 and the upper surface of any one of the magnets 35 have respective polarities opposed to each other, they may be arranged such that the lower surface of the magnet 25 and the upper surface of the magnet 35 have the same polarities. In other words, the turntable assembly 22 can also be rotated by the effect of magnetic forces of repulsion developed between the magnets 25 and 35 while the rotation thereof is guided within the recess 21.

Moreover, although the guide wheel 32 has been described as driven by the drive shaft 33 coupled to the geared motor M, it is also possible to drive the guide wheel by means of a pinion gear coupled to the motor, which pinion gear is held in mesh with gear teeth formed on the outer peripheral face of the guide wheel.

In addition, instead of the bottom wall of the oven-defining structure being recessed to provide the turntable seating recess 21, the bottom wall of the oven-defining structure on which the turntable assembly 22 is mounted may be flat. When the bottom wall of the oven-defining structure is either recessed, such as shown, or flat, a circular guide groove may be formed in the bottom wall of the oven-defining structure in which the rollers 29 are guided.

Furthermore, the magnetic shielding discs 28 may not be always necessary and, therefore, may be omitted.

Therefore, these changes and modifications are to be understood as included within the true scope of the present invention unless they depart therefrom.

What is claimed is:

1. In an electronic oven comprising a substantially cubic oven-defining structure having a bottom wall and an access opening leading into the interior of the oven-defining structure above the bottom wall, means positioned for generating high frequency energy towards the interior of the oven-defining structure, and a hingedly supported door for selectively opening and closing the access opening of the oven-defining structure for insertion into and removal from the interior of the oven-defining structure a material to be heat-treated by the high frequency energy, respectively, a turntable drive mechanism which comprises:

a turntable assembly for the support of a material to be heat-treated by the application of the high frequency energy within the interior of the oven-defining structure, said turntable assembly being removably positioned on the bottom wall of the oven-defining structure for rotation about its own center and having a rotation guiding and supporting structure thereon consisting of a plurality of three or more rollers, through which the turntable assembly is rotatably mounted on the bottom wall of the oven-defining structure, and means for connecting said rollers to said turntable assembly; a plurality of magnetic members carried by said turntable assembly;

a drive mechanism positioned below the bottom wall of the oven-defining structure and externally of the interior of the oven-defining structure;

a rotary carriage operatively coupled to said drive mechanism and positioned below the bottom wall of and externally of the interior of the oven-defining structure for rotation in one direction; and magnetic members equal in number to the number of the magnetic members carried by the turntable assembly and carried by said rotary carriage;

said turntable assembly being, during rotation of said rotary carriage, rotated by the effect of magnetic coupling between the magnetic members, carried by the turntable assembly, and the magnetic members carried by the rotary carriage.

2. An electronic oven as claimed in claim 1, wherein the bottom wall of the oven-defining structure is recessed outwardly of the interior of the oven-defining structure to provide a turntable seating recess, said turntable assembly being accommodated within said seating recess.

3. An electronic oven as claimed in claim 1, wherein the turntable assembly comprises a disc table, and further comprising enclosures carried by the turntable assembly, which enclosures are made of non-magnetizable metallic material and secured to the undersurface of the disc table facing the bottom wall of the oven-defining structure, the magnetic members carried by the turntable assembly being respectively accommodated within said enclosures.

4. An electronic oven as claimed in claim 2, wherein the turntable assembly comprises a disc table, and further comprising enclosures carried by the turntable assembly, which enclosures are made of non-magnetizable metallic material and secured to the undersurface of the disc table facing the bottom wall of the oven-defining structure, the magnetic members carried by the turntable assembly being respectively accommodated within said enclosures.

5. An electronic oven as claimed in claim 1, wherein the connecting means comprises a flexible ring member having shafts equal in number to the number of the rollers connected to the turntable assembly, said shafts extending radially outwardly from said flexible ring member in a plane parallel to the plane of rotation of the turntable assembly, the rollers connected to the turntable assembly being respectively rotatably mounted on said shafts, and wherein there is further provided means for restraining the flexible ring member from accidentally separating from the turntable assembly.

6. An electronic oven as claimed in claim 3, further comprising magnet holding fixtures surrounding the respective magnetic members carried by the turntable assembly, said fixtures being also accommodated within the respective enclosures.

7. An electronic oven as claimed in claim 4, further comprising magnet holding fixtures surrounding the respective magnetic members carried by the turntable assembly, said fixtures being also accommodated within the respective enclosures.

8. An electronic oven as claimed in claim 5, further comprising magnet holding fixtures surrounding the respective magnetic members carried by the turntable assembly, said fixtures also being accommodated within the respective enclosures.

9. An electronic oven as claimed in claim 6, wherein the connecting means comprises a flexible ring member having shafts equal in number to the number of the rollers connected to the turntable assembly, said shafts extending radially outwardly from said flexible ring member in a plane parallel to the plane of rotation of the turntable assembly, the rollers connected to the turntable assembly being respectively rotatably mounted on said shafts, and wherein each of the fixtures has a tongue protruding radially outwardly therefrom through the corresponding enclosure, the tongues in the fixtures restraining the flexible ring member from accidentally separating from the turntable assembly.

10. An electronic oven as claimed in claim 7, wherein the connecting means comprises a flexible ring member having shafts equal in number to the number of the rollers connected to the turntable assembly, said shafts extending radially outwardly from said flexible ring member in a plane parallel to the plane of rotation of the turntable assembly, the rollers connected to the turntable assembly being respectively rotatably mounted on said shafts, and wherein each of the fixtures has a tongue protruding radially outwardly therefrom through the corresponding enclosure, the tongues in the fixtures restraining the flexible ring member from accidentally separating from the turntable assembly.

11. An electronic oven as claimed in claim 8, wherein the connecting means comprises a flexible ring member having shafts equal in number to the number of the rollers connected to the turntable assembly, said shafts extending radially outwardly from said flexible ring member in a plane parallel to the plane of rotation of the turntable assembly, the rollers connected to the turntable assembly being respectively rotatably mounted on said shaft, and wherein each of the fixtures has a tongue protruding radially outwardly therefrom through the corresponding enclosures, the tongues in the fixtures restraining the flexible ring member from accidentally separating from the turntable assembly.

12. An electronic oven as claimed in claim 1, further comprising spacer rollers rotatably mounted on the rotary carriage in equally spaced relation to each other and also to the center of rotation of the rotary carriage and held in contact with the undersurface of the bottom wall of the oven-defining structure.

13. An electronic oven as claimed in claim 2, further comprising spacer rollers rotatably mounted on the rotary carriage in equally spaced relation to each other and also to the center of rotation of the rotary carriage and held in contact with the undersurface of the bottom wall of the oven-defining structure.

14. An electronic oven as claimed in claim 10, further comprising spacer rollers rotatably mounted on the rotary carriage in equally spaced relation to each other and also to the center of rotation of the rotary carriage and held in contact with the undersurface of the bottom wall of the oven-defining structure.

15. An electronic oven as claimed in claim 1, wherein each of the magnetic members carried by the turntable assembly and the rotary carriage is a permanent magnet.

16. An electronic oven as claimed in claim 15, wherein said permanent magnet is a ferritic anisotropic magnet containing strontium.

17. An electronic oven as claimed in claim 1, wherein said rollers through which said turntable assembly is rotatably mounted on the bottom wall of the oven-defining structure are positioned in equally spaced relation with respect to each other and also with respect to the center of rotation of the turntable assembly.

18. An electronic oven as claimed in claim 2, wherein said rollers through which said turntable assembly is rotatably mounted on the bottom wall of the oven-defining structure are positioned in equally spaced relation with respect to each other and also with respect to the center of rotation of the turntable assembly.

19. An electronic oven as claimed in claim 4, wherein said rollers through which said turntable assembly is rotatably mounted on the bottom wall of the oven-defining structure are positioned in equally spaced relation with respect to each other and also with respect to the center of rotation of the turntable assembly.

20. An electronic oven as claimed in claim 7, wherein said rollers through which said turntable assembly is rotatably mounted on the bottom wall of the oven-defining structure are positioned in equally spaced relation with respect to each other and also with respect to the center of rotation of the turntable assembly.

21. An electronic oven as claimed in claim 10, wherein said rollers through which said turntable assembly is rotatably mounted on the bottom wall of the oven-defining structure are positioned in equally spaced relation with respect to each other and also with respect to the center of rotation of the turntable assembly.

22. An electronic oven as claimed in claim 13, wherein said rollers through which said turntable assembly is rotatably mounted on the bottom wall of the oven-defining structure are positioned in equally spaced relation with respect to each other and also with respect to the center of rotation of the turntable assembly.

* * * * *